(12) United States Patent
Suzuki et al.

(10) Patent No.: US 9,513,788 B2
(45) Date of Patent: Dec. 6, 2016

(54) IMAGE PROCESSING APPARATUS, IMAGE PROCESSING METHOD, AND PROGRAM

(75) Inventors: Seiji Suzuki, Kanagawa (JP); Shunichi Kasahara, Kanagawa (JP)

(73) Assignee: Sony Corporation, Tokyo (JP)

( * ) Notice: Subject to any disclaimer, the term of this patent is extended or adjusted under 35 U.S.C. 154(b) by 74 days.

(21) Appl. No.: 13/479,814

(22) Filed: May 24, 2012

(65) Prior Publication Data

US 2012/0306918 A1 Dec. 6, 2012

(30) Foreign Application Priority Data

Jun. 1, 2011 (JP) ................................ 2011-123194

(51) Int. Cl.
| | |
|---|---|
| G06F 3/0484 | (2013.01) |
| G06T 7/20 | (2006.01) |
| G06K 9/00 | (2006.01) |
| G06Q 30/06 | (2012.01) |

(52) U.S. Cl.
CPC ....... *G06F 3/04845* (2013.01); *G06K 9/00362* (2013.01); *G06T 7/2046* (2013.01); *G06Q 30/0621* (2013.01); *G06T 2207/30196* (2013.01)

(58) Field of Classification Search
USPC ......................................................... 345/633
See application file for complete search history.

(56) References Cited

U.S. PATENT DOCUMENTS

| | | | | |
|---|---|---|---|---|
| 7,433,753 | B2 * | 10/2008 | Okada et al. ................. | 700/130 |
| 2004/0179233 | A1 * | 9/2004 | Vallomy ....................... | 358/1.15 |
| 2005/0215337 | A1 * | 9/2005 | Shirai et al. .................. | 473/151 |
| 2007/0233311 | A1 * | 10/2007 | Okada et al. ................. | 700/138 |
| 2009/0144173 | A1 * | 6/2009 | Mo ........................ | G06N 3/006 |
| | | | | 705/26.1 |
| 2009/0322763 | A1 * | 12/2009 | Bang et al. ................... | 345/474 |
| 2010/0266206 | A1 * | 10/2010 | Jo et al. ........................ | 382/190 |
| 2011/0040539 | A1 * | 2/2011 | Szymczyk et al. ............... | 703/6 |
| 2011/0110560 | A1 * | 5/2011 | Adhikari ....................... | 382/103 |

FOREIGN PATENT DOCUMENTS

| | | |
|---|---|---|
| JP | 09-044556 | 2/1997 |
| JP | 09-102033 | 4/1997 |
| JP | 2003-263632 | 9/2003 |
| JP | 2004-272530 | 9/2004 |
| JP | 2005-258537 | 9/2005 |

OTHER PUBLICATIONS

Nadia Magnenat-Thalmann and Etienne Lyard, "Virtual Mirror: A real-time motion capture application for virtual-try-on", Dec. 2006, MIRALab, Universite De Geneve.*
Zhong Li, Xiaogang Jin, Brian Barsky, Jun Liu, "3D Clothing Fitting Based on the Geometric Feature Matching", Sep. 1, 2009, Zhejiang Sci-Tech University.*
Shotton, J., et al., "Real-Time Human Pose Recognition in Parts from Single Depth Images", Microsoft Research [online], visited on May 23, 2011 at http://research.microsoft.com/pubs/145347/BodyPartRecognition.pdef, pp. 1-8.
May 19, 2016, Japanese Office Action for related JP Application No. 2015-141881.
Feb. 5, 2016, Chinese Office Action for related CN Application No. 201210167183.7.

* cited by examiner

*Primary Examiner* — Mark Zimmerman
*Assistant Examiner* — Yu-Jang Tswei
(74) *Attorney, Agent, or Firm* — Paratus Law Group, PLLC (57) ABSTRACT

Disclosed herein is an image processing apparatus including a display control part configured to display a human-figure virtual object image in a pose from which to extract information necessary for motion capture, the human-figure virtual object image being the object to be handled corresponding to a person targeted to be recognized.

20 Claims, 10 Drawing Sheets

VIRTUAL CLOTHES

TAKEN IMAGE

FIG.7B

USER REGION

FIG.7C

IMAGE DICTIONARY

FIG.7D

○ JOINT POSITIONS IN POSE IMAGE
● JOINT POSITIONS AFTER BEING MOVED

FIG.7E

THREE-DIMENSIONAL JOINT POSITIONS (BONES)

IMAGE PROCESSING APPARATUS, IMAGE PROCESSING METHOD, AND PROGRAM

BACKGROUND

The present disclosure relates to an image processing apparatus, an image processing method, and a program. More particularly, the disclosure relates to an image processing apparatus, an image processing method, and a program for allowing a user to perform a calibration process in natural, unaffected fashion.

There exists technology called AR (Augmented Reality) whereby the real world is virtually augmented by computer. An application of AR is trying-on of clothes. More specifically, according to the technology, the physical clothes worn by a user in his or her image taken by camera are replaced with virtual clothes so that the user can be seen wearing the virtual clothes (i.e., virtual clothes are overlaid on the user's image).

The AR for try-on purposes adopts motion capture technology for detecting the user's motions using various sensors such as acceleration sensors, geomagnetic sensors, cameras, and range scanners to make the virtual clothes fit on the user's body (i.e., on its image). Specifically, detecting the user's motions means continuously acquiring the positions of the user's joints as the target to be recognized.

The motion capture technology uses either of two techniques: technique with markers, and technique without markers.

The technique with markers involves attaching easily detectable markers to the user's joints. Detecting and acquiring the positions of these markers makes it possible to know the positions of the user's joints as the target to be recognized.

On the other hand, the technique without markers involves processing values obtained from various sensors so as to estimate the positions of the user's joints as the target to be recognized. For example, there exist algorithms for recognizing the user's pose (joint positions) from a depth image (i.e., an image indicative of depth information) taken by a three-dimensional measurement camera capable of detecting the depth distance of an object (e.g., see "Real-Time Human Pose Recognition in Parts from Single Depth Images," Microsoft Research [online], visited on May 23, 2011 on the Internet <URL: http://research.microsoft.com/pubs/145347/BodyPartRecognition.pdef>).

For the technique without markers to accurately estimate the positions of the user's joints involves acquiring the distances between the joints. Thus before motion capture is started, a calibration process is generally performed to calculate the distances between the joints on the basis of the values obtained by the various sensors. If the distances between the joints have been measured in advance using measuring tapes or the like, the calibration process is omitted.

In the calibration process, if three or more joints of the user to be estimated are arrayed in a straight line, the distances between the joints cannot theoretically be calculated. In such cases, the user has been requested to bend his or her joints into a particular pose called the calibration pose.

SUMMARY

The calibration process of the related art has had the following problems: the user often fails to understand the meaning of taking poses for calibration. For this reason, the user tends to have the impression that he or she is forced to take meaningless poses.

Also, where a motion capture process is performed to move a CG (computer graphics) character to track the user's motions for example, synchronization of the character with the user's motions is started when the calibration process is terminated. Thus as soon as the calibration process comes to an end, the character in a reference pose on an initial display abruptly turns into the calibration pose, which can appear as an awkward gesture of the character.

The present disclosure has been made in view of the above circumstances and provides arrangements for allowing the user to undergo the calibration process in natural, unaffected fashion.

According to one embodiment of the present disclosure, there is provided an image processing apparatus including a display control part configured to display a human-figure virtual object image in a pose from which to extract information necessary for motion capture, the human-figure virtual object image being the object to be handled corresponding to a person targeted to be recognized.

According to another embodiment of the present disclosure, there is provided an image processing method including displaying a human-figure virtual object image in a pose from which to extract information necessary for motion capture, the human-figure virtual object image being the object to be handled corresponding to a person targeted to be recognized.

According to a further embodiment of the present disclosure, there is provided a program for causing a computer to execute a process including displaying a human-figure virtual object image in a pose from which to extract information necessary for motion capture, the human-figure virtual object image being the object to be handled corresponding to a person targeted to be recognized.

According to an embodiment of the present disclosure embodied as outlined above, a human-figure virtual object image as the object to be handled corresponding to a person targeted to be recognized is displayed in a pose from which to extract information necessary for motion capture.

Incidentally, the program of the present disclosure may be offered transmitted via transmission media or recorded on recording media.

The image processing apparatus of the present disclosure may be either an independent apparatus or an internal block making up part of a single apparatus.

Thus according to some embodiments of the present disclosure, the user is prompted to undergo the calibration process in natural, unaffected fashion.

BRIEF DESCRIPTION OF THE DRAWINGS

Further advantages of the present disclosure will become apparent upon a reading of the following description and appended drawings in which.

DETAILED DESCRIPTION OF THE PREFERRED EMBODIMENTS

Typical Configuration of the Virtual Try-On System

Figure 1:
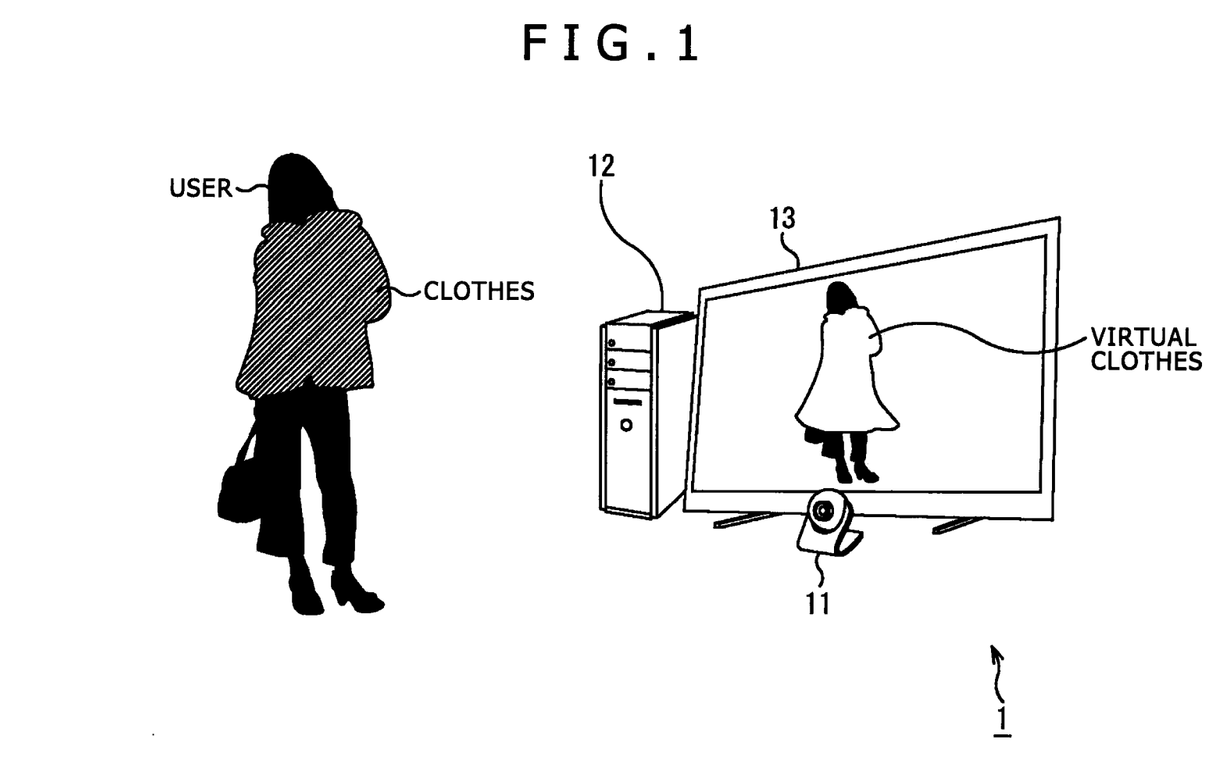
FIG. 1 is a schematic view showing a typical configuration of a virtual try-on system as one embodiment of the present disclosure.

FIG. 1 shows a typical configuration of a virtual try-on system 1 practiced as one embodiment of the present disclosure.

In FIG. 1, the virtual try-on system 1 applies AR (Augmented Reality) technology to the trying-on of clothes. This is a system that images a user and displays an image replacing the physical clothes worn by the user with virtual clothes.

The virtual try-on system 1 includes an imaging part 11 for imaging the user, an image processing part 12 for overlaying virtual clothes on images taken by the imaging part 11, and a display part 13 for displaying images showing the user wearing the virtual clothes.

The virtual try-on system 1 may be configured by combining different, dedicated pieces of hardware such as an imaging device acting the imaging part 11, an image processing device as the image processing part 13, and a display device as the display part 13. Alternatively, the virtual try-on system may be configured using a single general-purpose personal computer.

[Typical Configuration of the Computer]

Figure 2:
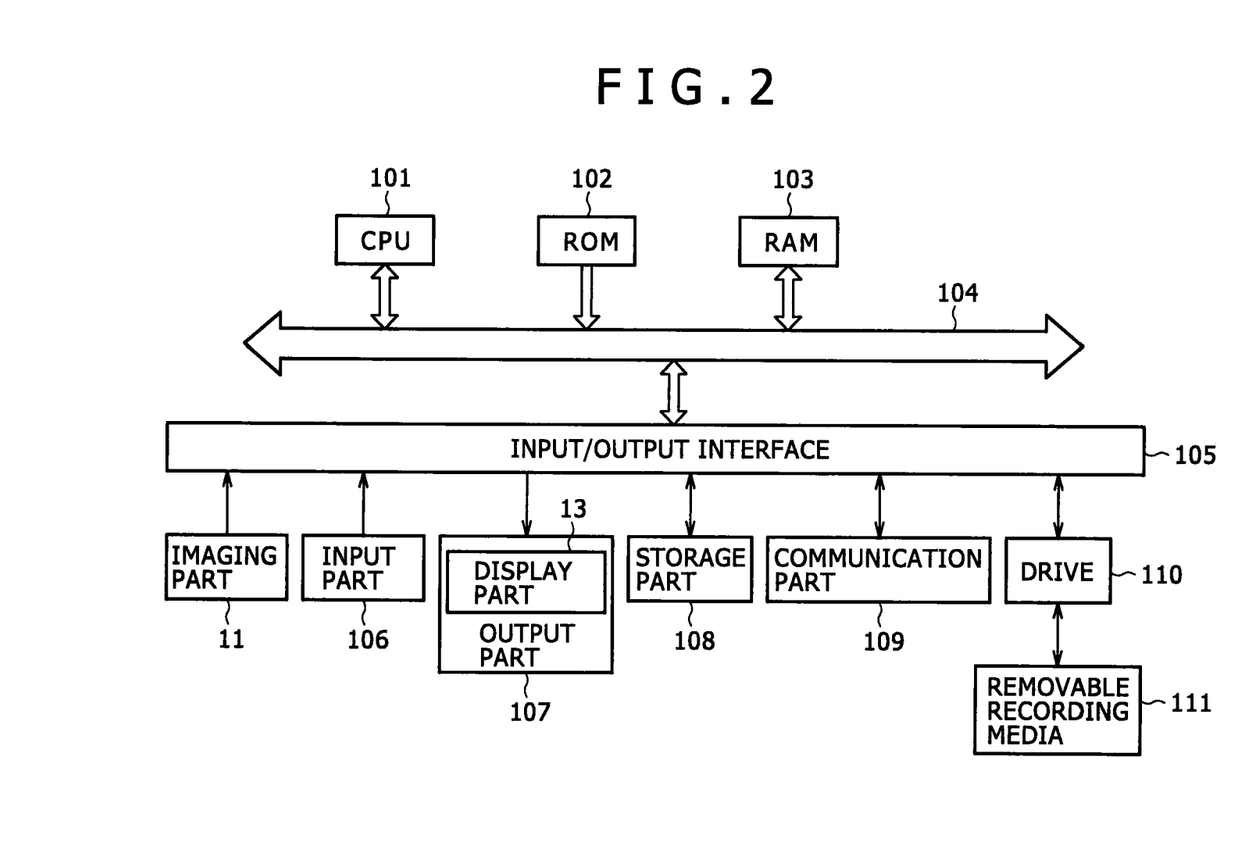
FIG. 2 is a block diagram showing a typical hardware configuration of the virtual try-on system.

FIG. 2 is a block diagram showing a typical hardware configuration of the virtual try-on system 1 configured using a personal computer. Of the reference characters in FIG. 2, those already used in FIG. 1 designate like or corresponding parts.

In the personal computer acting as the virtual try-on system 1, a CPU (central processing unit), a ROM (read only memory) 102, and a RAM (random access memory) 103 are interconnected via a bus 104.

An input/output interface 105 is also connected to the bus 104. The input/output interface 105 is coupled with the imaging part 11, an input part 106, an output part 107, a storage part 108, a communication part 109, and a drive 110.

The imaging part 11 is configured with an imaging element such as a CCD (charge coupled device) or a CMOS (complementary metal oxide semiconductor) sensor, and a range scanner capable of acquiring depth information about each of the pixels making up the imaging element, for example. The imaging part 11 images the user as the target to be recognized, and feeds images taken and depth information (i.e., data) about each of the configured pixels to the CPU 101 and other parts via the input/output interface 105.

The input part 106 is formed with a keyboard, a mouse, a microphone, etc. The input part 106 receives input information and forwards it to the CPU 101 and other parts via the input/output interface 105. The output part 107 is made up of the display part 13 (FIG. 1) such as a liquid crystal display, and speakers for outputting sounds. The storage part 108 is composed of a hard disk and/or a nonvolatile memory or the like, and stores diverse data for operating the virtual try-on system 1. The communication part 109 is configured using a network interface or the like which, when connected to networks such as a local area network and the Internet, transmits and receives appropriate information. The drive 110 drives removable recording media 111 such as magnetic disks, optical disks, magneto-optical disks, or semiconductor memories.

In the computer configured as described above, the CPU 101 loads programs from, for example, the storage part 108 into the RAM 103 for execution by way of the input/output interface 105 and bus 104, and carries out a series of processing of the virtual try-on system 1 as will be discussed below. That is, the programs for implementing the virtual try-on system 1 are loaded to and executed in the RAM 103 to bring out diverse functions to be explained below. The CPU 101 functions at least as an image processing part that overlays virtual clothes on images taken of the user and as a display control part that causes the display part 13 to display the overlaid images.

In the personal computer of FIG. 2, the programs may be installed via the input/output interface 105 into the storage part 108 from the removable recording media 111 attached to the drive 110. Alternatively, the programs may be received by the communication part 109 via wired or wireless transmission media such as local area network, the Internet and digital satellite broadcasts, before being installed into the storage part 108. As another alternative, the programs may be preinstalled in the ROM 102 or in the storage part 108.

[Overview of the Processing of the Virtual Try-on System 1]

Figure 3:
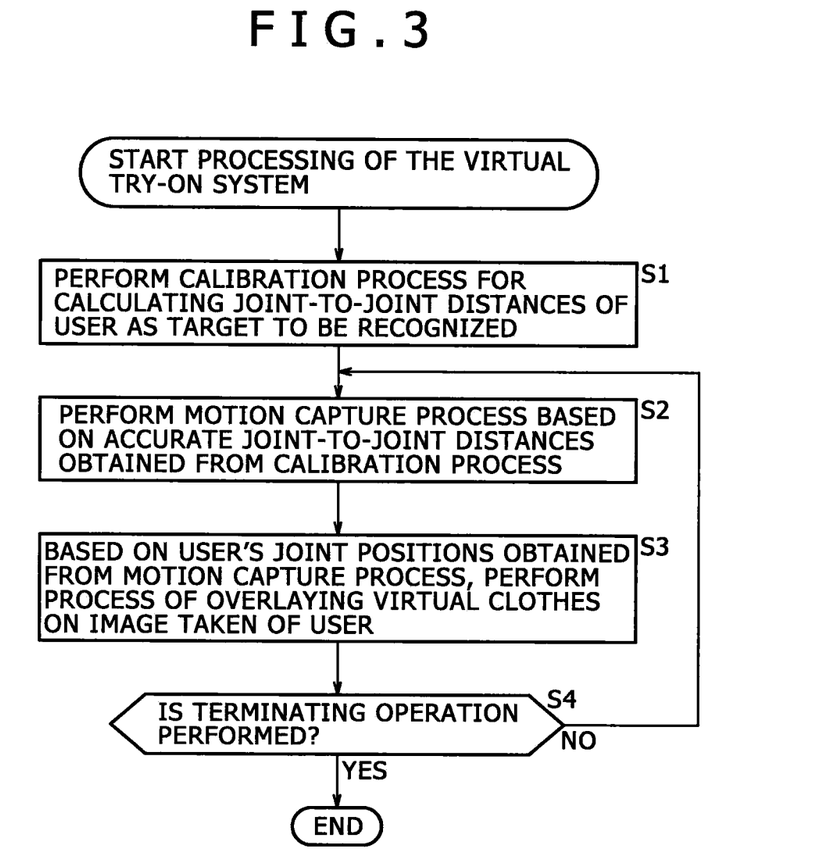
FIG. 3 is a flowchart explanatory of an outline of the processing performed by the virtual try-on system.

Explained below in reference to the flowchart of FIG. 3 is an overview of the processing carried out by the virtual try-on system 1. For example, the processing may be started when execution of the processing of the virtual try-on system 1 is ordered using the keyboard, mouse or the like.

First in step S1, the virtual try-on system 1 performs a calibration process for calculating the distances between the joints of the user as the target to be recognized.

In step S2, the virtual try-on system 1 performs a motion capture process based on the accurate distances between the joints obtained from the calibration process. The motion capture process is carried out to detect the positions of one or more joints of the user targeted to be recognized.

In step S3, on the basis of the positions of the user's joints obtained from the motion capture process, the virtual try-on system 1 performs the process of overlaying (an image of) virtual clothes to be tried on onto the image taken of the user. The image in which the virtual clothes are overlaid on the taken image resulting from this process is displayed on the display part 13.

In step S4, the virtual try-on system 1 determines whether or not a terminating operation is performed. If it is determined that the terminating operation has yet to be carried out, control is returned to step S2. In this manner, the processing is repeated whereby the user's motions (i.e., joint positions) are again detected, virtual clothes are overlaid on the taken image in a manner fit to the user's motions, and the resulting image is displayed on the display part 13.

If it is determined in step S4 that the terminating operation is carried out, the processing is terminated.

The processes performed in steps S1 through S3 in FIG. 3 will be described successively below in detail.

[Details of the Calibration Process]

What follows is a detailed explanation of the calibration process in step S1 of FIG. 3.

Figure 4:
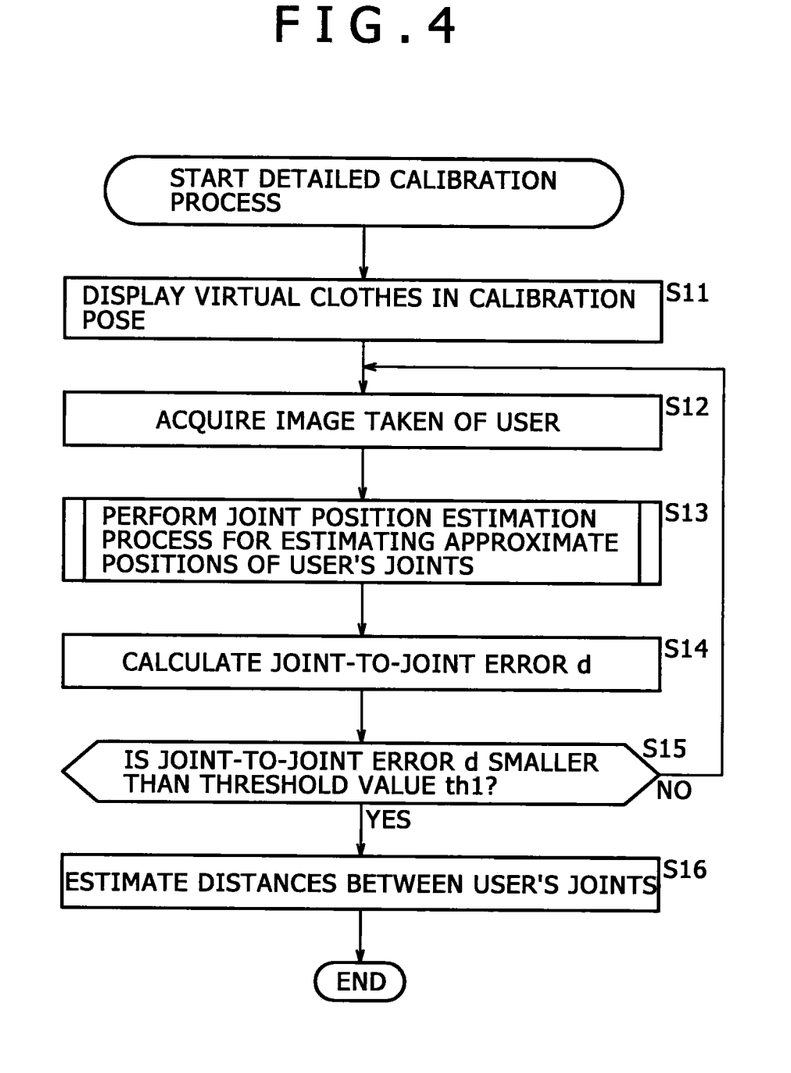
FIG. 4 is a detailed flowchart explanatory of a calibration process.

FIG. 4 is a detailed flowchart showing the calibration process carried out as step S1 in FIG. 3.

First in step S11 of the calibration process, the virtual try-on system 1 causes the display part 13 to display (an image of) virtual clothes in a calibration pose.

Figure 5:
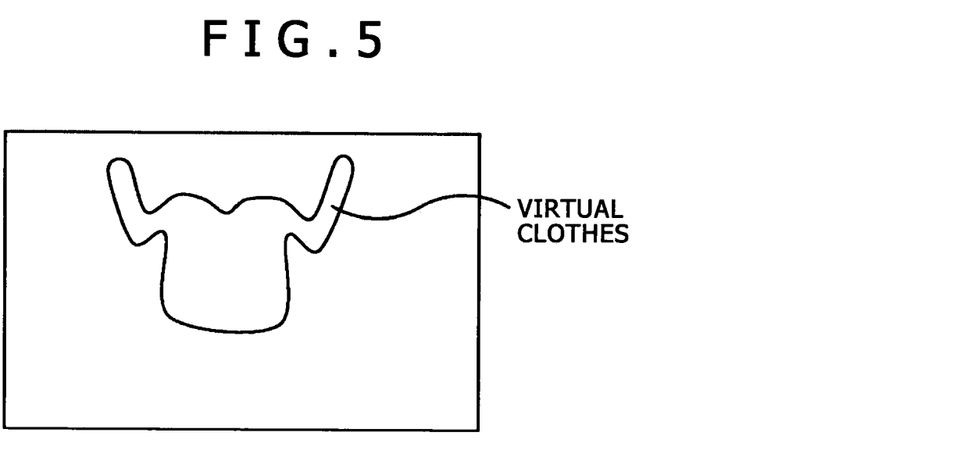
FIG. 5 is a schematic view showing a typical image of virtual clothes in a calibration pose.

FIG. 5 shows a typical image of virtual clothes displayed on the display part 13 by the virtual try-on system 1.

As an initial display of the calibration process, the virtual clothes in the calibration pose are displayed as shown in FIG. 5. The calibration pose is a pose that the user is asked to take by bending his or her appropriate joints to let the distances between the joints be calculated, the distances being necessary for performing a motion capture process.

When the virtual clothes are thus displayed in the calibration pose, the user is implicitly prompted to take the calibration pose as well; looking at the display in FIG. 5, the user is expected to assume a posture to fit into the virtual clothes. Alternatively, information for more explicitly asking the user to take the calibration pose may be presented, such as a caption saying "please take the same pose as the displayed clothes" or an audio message announcing the same.

In the example of FIG. 5, virtual clothes that cover the upper half of the body with the arm joints bent as shown are displayed. The distances between the leg joints may be estimated from the distances between the joints of the upper body calculated based on the pose of FIG. 5 (i.e., from the shape of the upper body). If the virtual clothes are for the lower half of the body such as pants or skirts, the virtual clothes may be displayed in a lower body calibration pose with the leg joints suitably bent.

After the virtual clothes in the calibration pose are displayed in step S11, step S12 is reached. In step S12, the virtual try-on system 1 acquires an image taken of the user by the imaging part 11.

In step S13, the virtual try-on system 1 performs a joint position estimation process for estimating the approximate positions of the user's joints. This process, to be discussed later in more detail with reference to FIG. 6, involves estimating the approximate positions of the user's joints. The position of the user's n-th joint (n=1, 2, . . . , N) estimated through this process is expressed using a joint position vector $p_n=(p_{nx}, p_{ny}, p_{nz})$.

In step S14, the virtual try-on system 1 calculates a joint-to-joint error d indicative of the error between the estimated position of each of the user's joints and the corresponding joint position of the virtual clothes. For example, the joint-to-joint error d may be calculated as $d=\Sigma|p_n-c_n|$, where $c_n$ represents a joint position vector of the virtual clothes corresponding to the joint position vector $p_n$, and $\Sigma$ denotes a total sum covering the first through the N-th joint.

In step S15, the virtual try-on system 1 determines whether the calculated joint-to-joint error d is smaller than a predetermined threshold value th1. If it is determined in step S15 that the calculated joint-to-joint error d is equal to or larger than the threshold value th1, control is returned to step S12. Then the process for calculating the joint-to-joint error d is carried out again.

If it is determined in step S15 that the calculated joint-to-joint error d is smaller than the threshold value th1, control is passed to step S16. In step S16, the virtual try-on system 1 estimates the distances between the user's joints based on the estimated positions of the joints. The process for estimating the distances between the joints will be discussed further after the joint position estimation process is explained with reference to FIG. 6. With the distances between the user's joints estimated, the calibration process is terminated.

[Details of the Joint Position Estimation Process]

Figure 6:
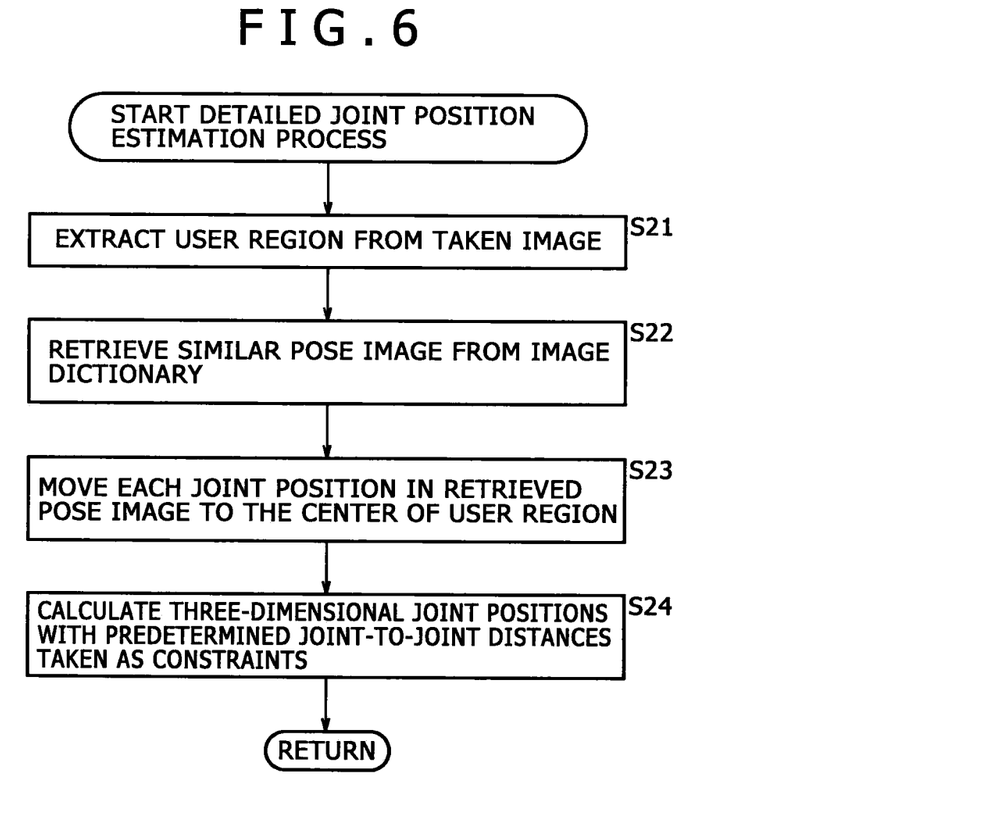
FIG. 6 is a detailed flowchart explanatory of a joint position estimation process.

The joint position estimation process performed in step S13 of FIG. 4 is explained below in detail with reference to the flowchart of FIG. 6. In explaining each of the steps in FIG. 6, reference will be made as needed to FIGS. 7A through 7E.

First in step S21, the virtual try-on system 1 extracts a user region from the user's image taken and acquired in step S12. The extraction of the user region may be based on the background differencing technique, for example.

Figure 7A:
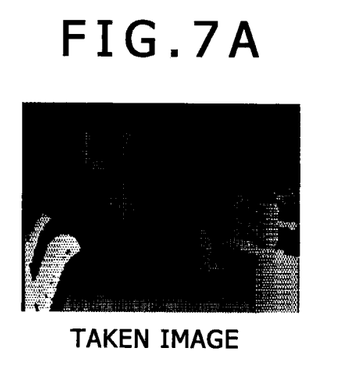
FIGS. 7A, 7B, 7C, 7D and 7E are schematic views explanatory of the joint position estimation process in detail.
Figure 7B:
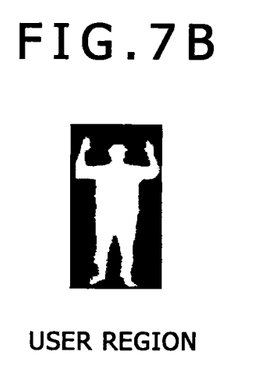

FIG. 7A shows a typical image of the user taken and acquired in step S12. FIG. 7B shows a typical user region (human-figure void area) extracted from the taken image. Upon extraction of the user region in step S21, the user is expected to take the calibration pose in a manner fitting into the virtual clothes. This makes it possible to limit to a certain extent the range in which to search for the user region based on the area where the virtual clothes are being displayed. In other words, there is no need to perform a process to search the entire display area of the virtual clothes for the user region. Because asking the user to take a posture fitting into the virtual clothes in the calibration pose limits the range in which to search for the user region, calculation costs can be reduced and processing speed can be enhanced.

In step S22, based on the extracted user region, the virtual try-on system 1 retrieves a pose image similar to the user's pose from within an image dictionary stored beforehand in the storage part 108.

The storage part 108 holds an image dictionary containing numerous images as calibration pose images taken of persons of diverse body types. Each of the pose images is stored in conjunction with the positions of a model's joints in effect when the image of his or her pose was taken.

Figure 7C:
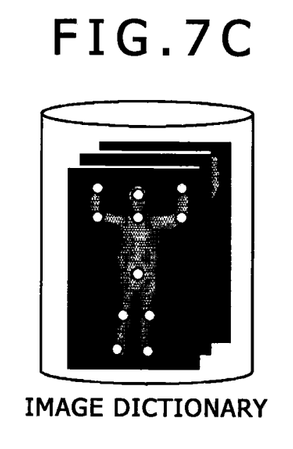

FIG. 7C shows examples of images in the dictionary stored in the storage part 108. Blank circles in the figure (○) indicate joint positions. In step S22, a pose image similar to the user's pose is retrieved from the image dictionary using the pattern matching technique, for example.

In step S23, the virtual try-on system 1 acquires from the storage part 108 the position of each of the model's joints stored in conjunction with the retrieved pose image, and moves each joint position two-dimensionally to the center of the user region. Moving two-dimensionally means moving only the x and y coordinates of the model's joint position vector $p'_n=(p'_{nx}, p'_{ny}, p'_{nz})$.

Figure 7D:
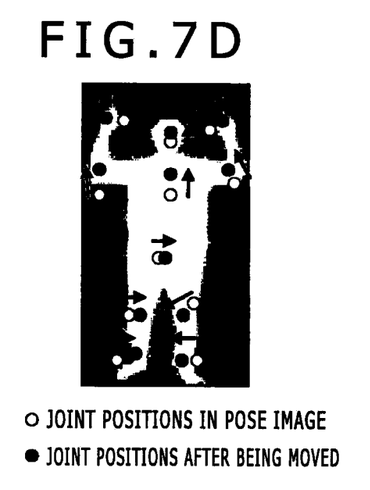
Figure 7E:
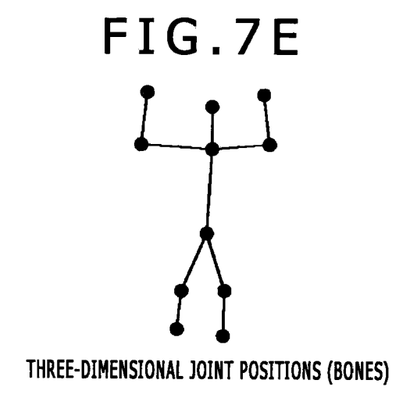

FIG. 7D shows how the positions of the joints indicated by blank circles (○) in the pose image are moved to the joint positions denoted by shaded circles corresponding to the user region.

In step S24, under constraints of predetermined joint-to-joint distances, the virtual try-on system 1 calculates (restores) three-dimensional joint positions from the two-dimensional joint positions. That is, in step S24, with the average joint-to-joint distances of the average adult taken as the constraint, the three-dimensional joint positions are calculated from the two-dimensional joint positions. Because this process is part of the calibration process and because the user while taking the calibration pose is right in front of the imaging part 11, the three-dimensional joint positions can be restored on the assumption that all depth information is the same. This provides the three-dimensional joint positions (i.e., bones) such as those shown in FIG. 7E.

In the manner explained above, the approximate positions of the user's joints are estimated. The joint-to-joint error d is calculated based on the approximate positions of the user's joints thus estimated. When the joint-to-joint error d is determined to be smaller than the threshold value th1, the distances between the user's joints are estimated in step S16 of FIG. 4.

Explained here is how to estimate joint-to-joint distances in step S16 of FIG. 4. The user is right in front of the imaging part 11 while the calibration pose is being taken, so that all depth information can be considered to be the same. For this reason, the joint-to-joint distances can be obtained from the two-dimensional joint positions in effect when the joint-to-joint error d is determined to be smaller than the threshold value th1, and the joint-to-joint distances thus acquired can be taken as the three-dimensional distances between the joints.

[Details of the Motion Capture Process]

What follows is a detailed explanation of the motion capture process performed in step S2 of FIG. 3.

The motion capture process involves detecting (i.e., recognizing) the positions of one or more of the user's joints as the target to be recognized. Thus the process in step S2 of FIG. 3 involves basically carrying out the joint position estimating process (explained above in reference to FIG. 6) on the user's image taken by the imaging part 11.

It should be noted that between the two kinds of joint position estimation processing, one as part of the calibration process and the other as the motion capture process subsequent to the calibration process, there exist the following two differences:

As the first difference, the pose image searched for and retrieved in step S23 is different between the two processes. During the calibration process, the user is supposed to take the calibration pose. Thus the pose image to be retrieved from the image dictionary in the storage part 108 can be obtained by making a search only through the calibration pose images. On the other hand, during the motion capture process following the calibration process, the user may take various poses, which may be necessary to make a search through the diverse pose images stored in the storage part 108.

As the second difference, the constraints in effect upon calculation of three-dimensional joint positions in step S24 are different. During the calibration process, three-dimensional joint positions are calculated with the average joint-to-joint distances of the average adult taken as the constraint. On the other hand, during the motion capture process following the calibration process, three-dimensional joint positions are calculated under constraints of the distances between the user's joints obtained from the calibration process (in step S16).

In the ensuing description, the information indicative of the positions of each of the user's joints acquired from the motion capture process may be generically referred to as the skeleton information where appropriate.

[Details of the Process of Overlaying Virtual Clothes]

What follows is a detailed explanation of the process of overlaying virtual clothes in step S3 of FIG. 3.

Figure 8:
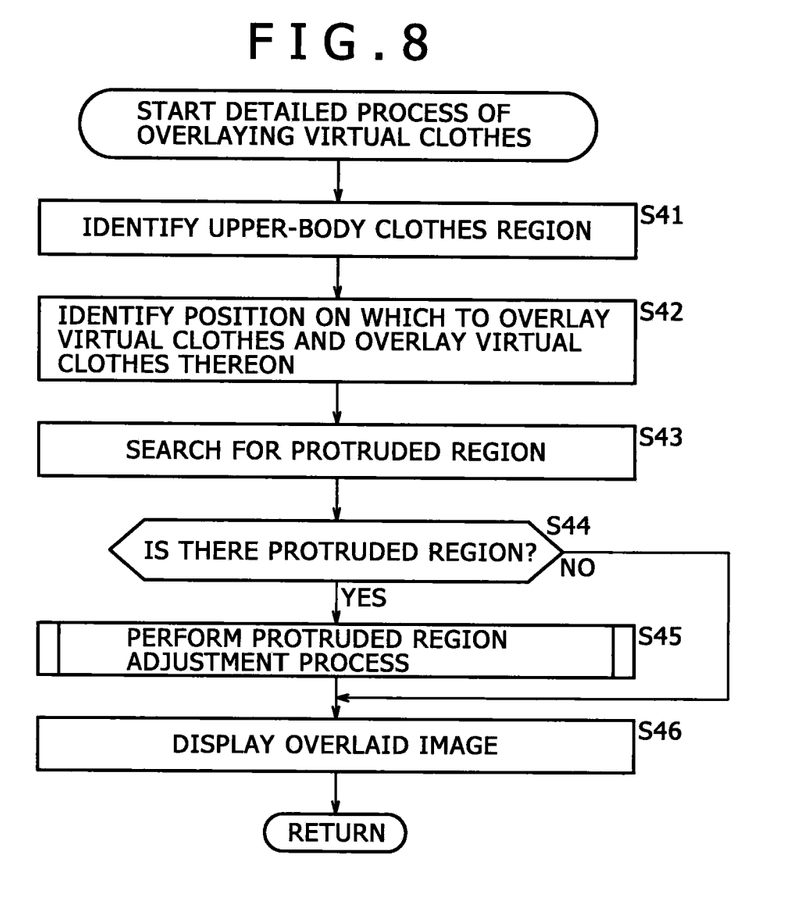
FIG. 8 is a detailed flowchart explanatory of a process in which virtual clothes are overlaid.

FIG. 8 is a detailed flowchart of the process of overlaying virtual clothes as carried out in step S3 of FIG. 3.

In this process, virtual clothes are overlaid on the image taken of the user by the imaging part 11 during the motion capture process, the taken image being one of which the three-dimensional positions of the user's joints are calculated.

First in step S41, the virtual try-on system 1 identifies an upper-body clothes region in the user region image extracted from the user's image taken. For example, the virtual try-on system 1 may identify the upper-body clothes region on the upper-body side of the user region, using a graph cut technique or the like whereby groups of pixels bearing similar color information are extracted.

In step S42, based on the user's skeleton information, the virtual try-on system 1 identifies that position of the taken image on which to overlay the virtual clothes to be tried on, and overlays the virtual clothes on the identified position of the user's image. It is assumed that the sequence in which the virtual clothes are overlaid for try-on purposes is predetermined or determined by the user's selecting operations. Virtual clothes data is stored beforehand in the storage part 108, and the regions of the virtual clothes are assumed to be known. Thus if the user's skeleton information is known, the position on which to overlay the virtual clothes can be identified.

In step S43, the virtual try-on system 1 compares the identified clothes region of the user's upper body (called the upper-body clothes region hereunder) with the region on which the virtual clothes are overlaid. In making the comparison, the virtual try-on system 1 searches for a protruded region made up of protrusions of the upper-body clothes region from inside the virtual clothes-overlaid region.

Figure 9:
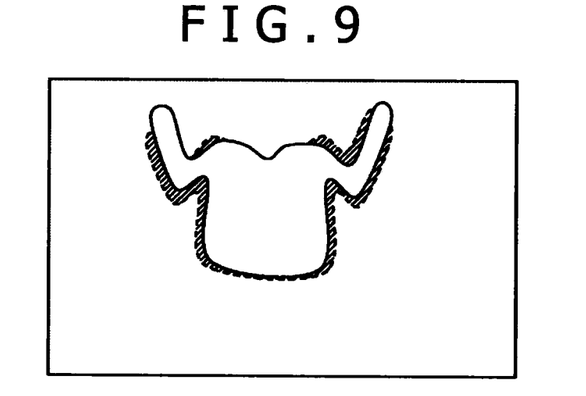
FIG. 9 is a schematic view explanatory of a protruded region.

For example, in FIG. 9, the clothes region enclosed by solid lines denotes the virtual clothes-overlaid region, and the clothes region enclosed by broken lines represents the user's upper-body clothes region. The shaded portions outside the clothes region enclosed by solid lines and inside the clothes region enclosed by broken lines constitute the protruded region.

In step S44, the virtual try-on system 1 determines whether or not any protruded region exists. If it is determined in step S44 that no protruded region exists, step S45 (to be discussed below) is skipped and step S46 is reached.

If it is determined in step S44 that there exists a protruded region, control is passed to step S45. In step S45, the virtual try-on system 1 performs a protruded region adjustment process in which the protruded region is adjusted.

If there exists a protruded region, portions of the clothes actually worn by the user appear outside the virtual clothes, which can be an awkward expression. Thus in step S45, a first or a second protruded area adjustment process is carried out to make the upper-body clothes region coincide with the virtual clothes-overlaid region, the first process expanding the virtual clothes, the second closing narrowing the upper-body clothes region. More specifically, the first process involves expanding the virtual clothes circumferentially by an appropriate number of pixels until the virtual clothes-overlaid region covers the user's upper-body clothes region, so that the upper-body clothes region of the protruded region is replaced with the virtual clothes. The second process involves replacing the upper-body clothes region of the protruded region with a predetermined image such as a background image.

In step S46, the virtual try-on system 1 causes the display part 13 to display an overlaid image in which the virtual clothes are overlaid on the user's image taken. This completes the virtual clothes overlaying process, and control is returned to the process shown in FIG. 3.

[Details of the Protruded Region Adjustment Process]

What follows is an explanation of the protruded region adjustment process performed in step S45 of FIG. 8.

Figure 10:
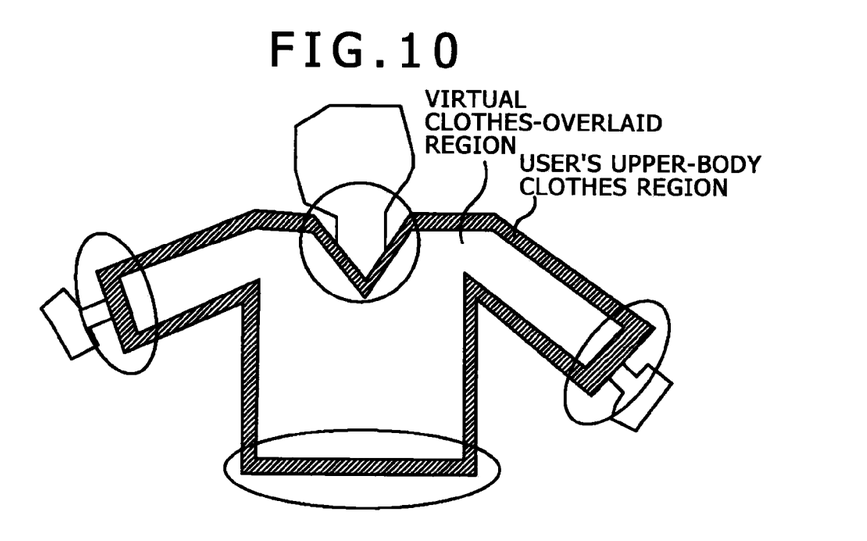
FIG. 10 is another schematic view explanatory of the protruded region.

In step S45, as explained above, either the first or the second protruded region adjustment process is carried out, the first process expanding the virtual clothes circumferentially by an appropriate number of pixels until the virtual clothes-overlaid region covers the user's upper-body clothes region so that the upper-body clothes region of the protruded region is replaced with the virtual clothes, the second process replacing the upper-body clothes region of the protruded region with a predetermined image such as a background image. Which of the first and the second process is to be performed may be determined either in advance or by operations performed by the user or by a shop assistant on each occasion. For example, if the user wants to check the size of virtual clothes, the first process for changing the size (i.e., region) of the virtual clothes is not suitable for the occasion, so that the second process is selected and executed.

Where the second process is selected and carried out, an attempt to substitute the background image uniformly for the protruded region including the collar, bottom edge and sleeves indicated by circles in FIG. 10 may well result in an awkward expression (image) in which the background image separates the neck from the virtual clothes.

To avoid such an eventuality, the virtual try-on system 1 upon execution of the second process classifies the protruded region as a region to be replaced with the background image or as a region to be replaced with some image other than the background image. Depending on the result of the classification, the virtual try-on system 1 replaces the protruded region with either the background image or some other image so as to narrow the user's clothes image of the protruded region. The regions which correspond to the collar, bottom edge and sleeves and which are to be replaced with an image other than the background image are detected as a special processing region by the CPU 101 acting as a region detection part.

Figure 11:
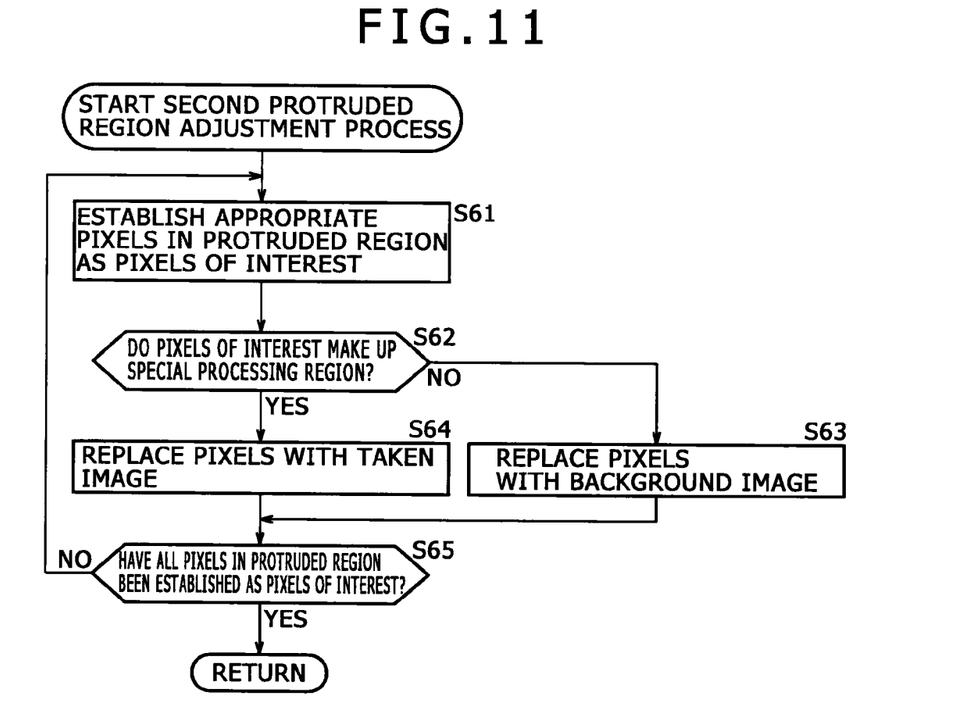
FIG. 11 is a flowchart explanatory of a second protruded region adjustment process.

FIG. 11 is a flowchart showing the second protruded region adjustment process.

First in step S61 of this process, the virtual try-on system 1 establishes appropriate pixels inside the protruded region as the pixels of interest.

In step S62, the virtual try-on system 1 determines whether the pixels of interest make up the special processing region, i.e., the region covering the collar, bottom ledge or sleeves. Whether or not the pixels of interest make up the region of the collar, bottom edge or sleeves may be determined on the basis of the user's skeleton information. If the virtual clothes are of a fixed shape, the determination may be made based on the shape of the virtual clothes.

If it is determined in step S62 that the pixels of interest do not make up the special processing region, control is passed to step S63. In step S63, the virtual try-on system 1 replaces the pixel values of the pixels of interest with those of the corresponding pixels in the background image. The background image is assumed to have been acquired and stored in the storage part 108 beforehand.

If it is determined in step S62 that the pixels of interest make up the special processing region, control is passed to step S64. In step S64, the virtual try-on system 1 replaces the pixel values of the pixels of interest with those of the pixels in the taken image which are near the pixels of interest.

More specifically, if the pixels of interest make up the collar region, the virtual try-on system 1 replaces the pixel values of the pixels of interest with those of the collar region in a manner expanding the image of the neck toward the collar region (downward in FIG. 10). If the pixels of interest make up the bottom edge region, the virtual try-on system 1 replaces the pixel values of the pixels of interest with those of the lower-body clothes region in a manner expanding the user's lower-body clothes image such as the image of trousers or a skirt in the taken image toward the bottom edge region (upward in FIG. 10). Further, if the pixels of interest make up the sleeve region, the virtual try-on system 1 replaces the pixel values of the pixels of interest with those of the wrist region in a manner expanding the wrist image toward the sleeve region. The direction in which to make the expansion can also be determined based on the skeleton information.

As explained, where the pixels of interest make up the special processing region, they are replaced with the pixel values of the taken image in the surroundings and not with those of the background image. This makes it possible to avoid the awkward expression (overlaid display) that may be observed when the virtual clothes are overlaid.

In step S65 following step S63 or S64, the virtual try-on system 1 determines whether all pixels within the protruded region have been established as the pixels of interest.

If it is determined in step S65 that not all pixels in the protruded region are established as the pixels of interest, control is returned to step S61 and the subsequent processing is repeated. That is, other pixels in the protruded region are established as the pixels of interest, and the pixel values of the newly established pixels of interest are again replaced with those of the appropriate pixels in the image.

If it is determined in step S65 that all pixels in the protruded region have been established as the pixels of interest, the protruded region adjustment process is terminated, and control is returned to the process shown in FIG. 8.

As explained above, the virtual try-on system 1 displays the virtual clothes in the calibration pose as an initial display of the calibration process. This prompts the user implicitly to take the calibration pose as well, and prevents the awkward motion in which the virtual clothes as the object to be handled in keeping with the movement of the user as the target to be recognized are abruptly turned into the calibration pose upon completion of the calibration.

In the preceding example, the object to be handled in keeping with the movement of the user targeted to be recognized is the virtual clothes. However, characters created by computer graphics (CG) are commonly used as the object to be handled. The object to be handled may thus be a human-figure virtual object.

Where the protruded region is found to exist while virtual clothes are being displayed overlaid on the image taken of the user, the virtual try-on system 1 performs the process of replacing the protruded region image with a predetermined image such as the image of the virtual clothes, the background image, or the user's image taken. This prevents the awkward expression that may be observed when the virtual clothes are overlaid.

[Typical Applications of the Virtual Try-on System 1]

Some typical applications of the above-described virtual try-on system 1 are explained below.

When clothes are tried on in the real world, the sense of touch such as how the clothes fit on one's body, how thick the material is, and how the texture feels to the touch can play an important role in the selection of the clothes. But it is difficult for an AR system to provide the user with the same sense of touch as in the real world. Given that restriction, what follows is an explanation of applications in which the virtual try-on system 1 performs an additional process of converting information about the tactile sensation actually felt by the user when trying on physical clothes into visual or audio information to be presented to the user.

[Application in which the Expression of Size is Presented]

Explained first is a size expression presentation process for expressing how the size is felt (locally in particular) by touch when clothes are tried on, such as "a tight feeling around the elbows when the arms are bent."

Figure 12:
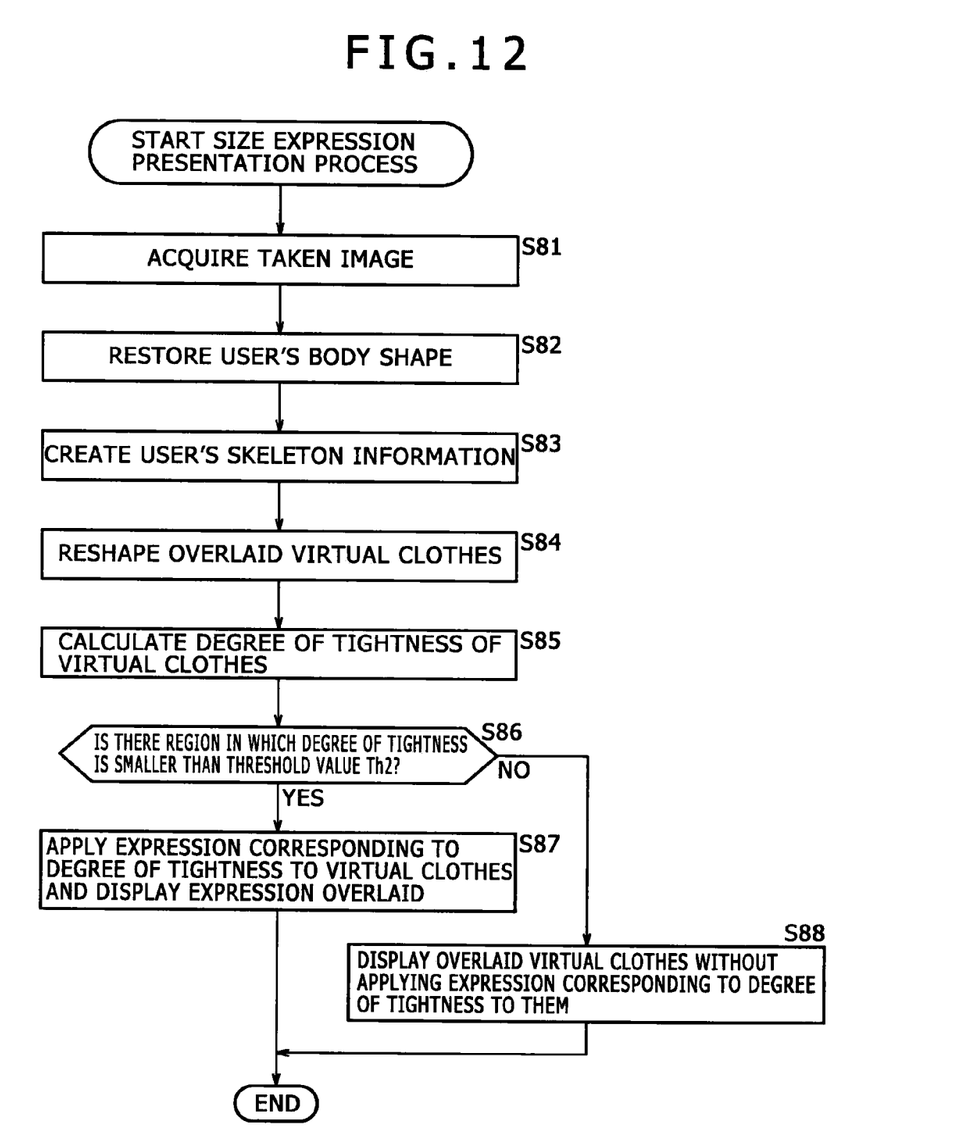
FIG. 12 is a flowchart explanatory of a size expression presentation process.

FIG. 12 is a flowchart showing the size expression presentation process.

First in step S81 of this process, the virtual try-on system 1 acquires an image taken of the user.

In step S82, the virtual try-on system 1 restores from the taken image the user's body shape (three-dimensional shape) by applying the Shape-from-Silhouette method or the use of a depth camera, for example.

In step S83, the virtual try-on system 1 creates the user's skeleton information from the taken image or from the user's body shape that has been restored.

In step S84, the virtual try-on system 1 reshapes the overlapping virtual clothes based on the user's skeleton information that has been created. That is, the virtual clothes are reshaped to fit to the user's motions (joint positions).

In step S85, the virtual try-on system 1 calculates the degree of tightness of the virtual clothes with regard to the user's body shape. For example, the degree of tightness may be calculated using ICP (Iterative Closest Point) or like algorithm for calculating errors between three-dimensional shapes with regard to one or more predetermined regions of virtual clothes such as the shoulders and elbows. The smaller the difference (error) between the virtual clothes and the user's body shape, the smaller the degree of tightness is determined to be. It is assumed that the three-dimensional shape of the virtual clothes is input in advance and is already known.

In step S86, the virtual try-on system 1 determines whether there is any region in which the degree of tightness is smaller than a predetermined threshold value Th2.

If it is determined in step S86 that there is a region in which the degree of tightness is smaller than the threshold value Th2, control is passed to step S87. In step S87, the virtual try-on system 1 applies an expression corresponding to the degree of tightness to the overlaid virtual clothes and causes the expression to be displayed overlaid on the user's image. Specifically, with regard to the region in which the degree of tightness is smaller than the threshold value Th2, the virtual try-on system 1 may show the virtual clothes to be torn apart or stretched thin (the color of the material may be shown fainter) or may output a ripping sound indicative of the virtual clothes getting ripped.

If it is determined in step S86 that there is no region in which the degree of tightness is smaller than the threshold value Th2, control is passed to step S88. In step S88, the virtual try-on system 1 overlays on the user's image the virtual clothes reshaped to fit to the user's motions, without applying any expression corresponding to the degree of tightness to the display.

When the above-described process is carried out, it is possible to express visually or audibly the tactile sensation actually felt by the user with regard to the size of the physical clothes being tried on.

[Application in which the Expression of Touch is Presented]

What follows is an explanation of a touch expression presentation process for expressing the sense of touch with regard to the texture. In this case, the storage part 108 stores the data about the virtual clothes to be tried on in conjunction with an index as metadata indicative of their tactile sensations. For example, the friction coefficient of the texture of virtual clothes or the standard deviation of irregularities over the texture surface may be adopted as the tactile sensation index.

Figure 13:
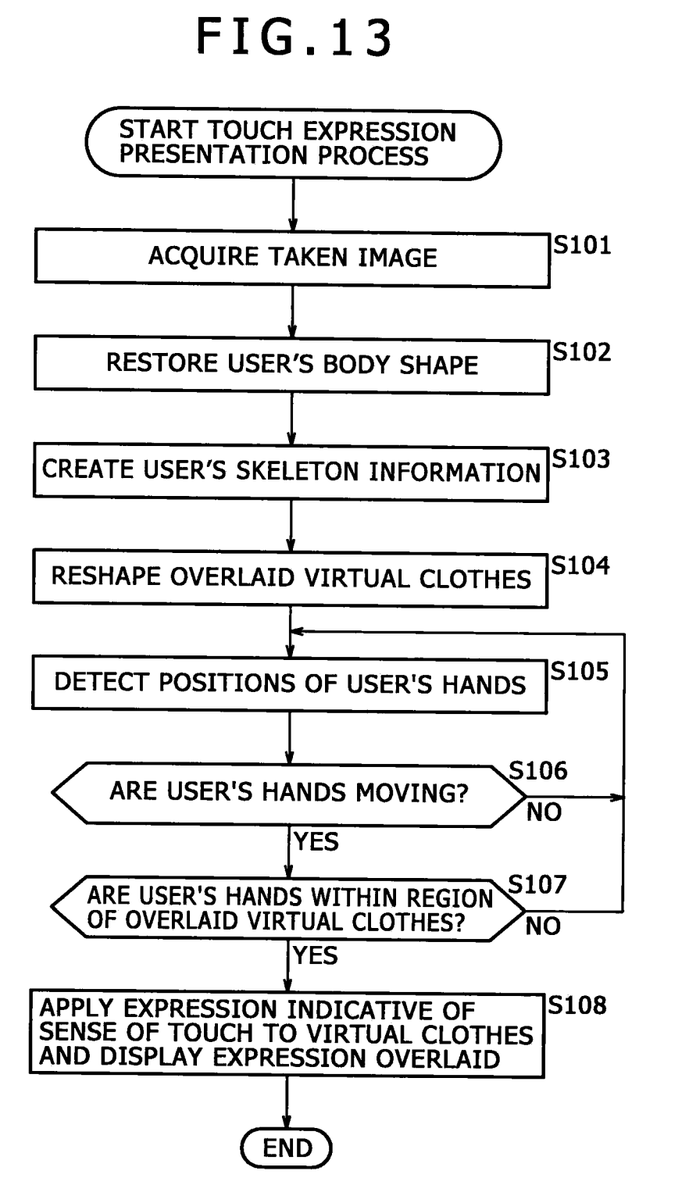
FIG. 13 is a flowchart explanatory of a touch expression presentation process.

FIG. 13 is a flowchart showing the touch expression presentation process.

The processing from step S101 to step S104 is the same as that from step S81 to step S84 in FIG. 12 and thus will not be discussed further.

In step S105, the virtual try-on system 1 detects the positions of the user's hands. The user's hand positions may be obtained either from previously created skeleton information or by recognizing the shapes of the hands from the image taken of the user.

In step S106, the virtual try-on system 1 determines whether the user's hands are moving.

If it is determined in step S106 that the user's hands are not moving, control is returned to step S105.

If it is determined in step S106 that the user's hands are moving, control is passed to step S107. In step S107, the virtual try-on system 1 determines whether the user's hands are within the region of the overlaid virtual clothes.

If it is determined in step S107 that the user's hands are outside the region of the overlaid virtual clothes, control is returned to step S105.

If it is determined in step S107 that the user's hands are within the region of the overlaid virtual clothes, control is passed to step S108. In step S108, the virtual try-on system 1 applies an expression indicative of the sense of touch to the overlaid virtual clothes based on the index representative of the tactile sensation of the virtual clothes, and causes the expression to be displayed overlaid on the image.

For example, based on the index indicative of the tactile sensation of the virtual clothes, the virtual try-on system 1 performs the process of drawing virtual clothes pilling on the surface in proportion to the number of times the clothes are rubbed by hand, or of outputting a sound reflecting the texture being touched such as a "squish" or a "rustle." The number of pills and their sizes or the frequency with which the sound is given may be varied depending on the index representative of the tactile sensation of the virtual clothes.

The expression of the touch is not limited to cases in which the virtual clothes are rubbed by hand. The expression indicative of a similar sense of touch may also be applied to cases where virtual clothes are brought into contact with a predetermined object or to cases where the material of virtual clothes comes into contact with that of other virtual clothes.

Although the processes in FIGS. 12 and 13 were each explained above as a single process flow, they may be inserted where appropriate between the processing steps shown in FIG. 3 or elsewhere.

[Application in which the Expression of Stiffness is Presented]

Explained below is a stiffness expression presentation process for expressing the tactile sensation of stiffness of clothes attributable mainly to the thickness of their texture.

In that case, the data about the virtual clothes to be tried on is stored in the storage part 108 in conjunction with an index as metadata indicative of the stiffness of their textures. For example, the thickness or tensile strength of the texture may be adopted as the texture stiffness index.

During the stiffness expression presentation process, the virtual try-on system 1 may reshape the overlaid virtual clothes in keeping with the user's motions by making the virtual clothes flutter (float) based on the texture stiffness index in effect. To what extent virtual clothes are made to flutter may be varied depending on the texture stiffness index of the virtual clothes in question. This makes it possible to present visually the stiffness of the texture that is felt essentially as a tactile sensation.

[Application in which the Expression of Warmth is Presented]

The warmth felt when clothes are worn varies with the material and thickness of the clothes in question. Below is an explanation of a warmth expression presentation process for visually expressing the sensation of warmth.

In that case, the data about the virtual clothes to be tried on is stored in the storage part 108 in conjunction with an index as metadata indicative of the warmth felt when the clothes are worn. For example, an appropriate value predetermined for each of the materials of clothes (cotton, wool, etc.) may be adopted as the warmth index.

The virtual try-on system 1 performs the warmth expression presentation process on the image being displayed overlaid. Depending on the warmth index of the virtual clothes being tried on, the process may involve replacing the background image with an image of Hawaii or of some other region in the South where the weather is warm, replacing the color tone of the background image with a warm color or a cold color, or giving the background image special effects of distortion such as a heat haze as if the air is shimmering with the heat.

Alternatively, the above-mentioned image changes or special effects may be applied to the image displayed overlaid in accordance with the warmth index representing the temperature of the location where the user is being imaged or the user's body temperature, each temperature measured by a suitable temperature sensor. As another alternative, the user's sensible temperature calculated with the virtual clothes tried on may be compared with the user's body temperature currently measured. The difference between the two temperatures may be used as the warmth index according to which the above-mentioned image changes or special effects may be carried out.

As a further alternative, it is also possible to provide the above-mentioned image changes or special effects using as the warmth index a suitably weighted combination of the value set for each of the materials of clothes (cotton, wool, etc.), the temperature of the location where the image is being taken, and the user's body temperature.

In this specification, the steps described in the flowcharts may be carried out not only in the depicted sequence (i.e., chronologically) but also parallelly or individually when they are invoked as needed.

Also in this specification, the term "system" refers to an entire configuration made up of a plurality of component apparatuses.

It should be understood by those skilled in the art that various modifications, combinations, sub-combinations and alterations may occur depending on design requirements and other factors in so far as they are within the scope of the appended claims or the equivalents thereof.

The present disclosure may also be configured as follows:

(1)

An image processing apparatus including a display control part configured to display a human-figure virtual object image in a pose from which to extract information necessary for motion capture, the human-figure virtual object image being the object to be handled corresponding to a person targeted to be recognized.

(2)

The image processing apparatus described in paragraph (1) above, wherein the information necessary for motion capture is the distances between joints of the person.

(3)

The image processing apparatus described in paragraph (1) or (2) above, wherein the display control part additionally presents information for prompting the person to take a posture conforming to the pose.

(4)

The image processing apparatus described in paragraph (1), (2) or (3), wherein the human-figure virtual object image is an image of virtual clothes for try-on purposes.

(5)

An image processing method including displaying a human-figure virtual object image in a pose from which to extract information necessary for motion capture, the human-figure virtual object image being the object to be handled corresponding to a person targeted to be recognized.

(6)

A program for causing a computer to execute a process including displaying a human-figure virtual object image in a pose from which to extract information necessary for motion capture, the human-figure virtual object image being the object to be handled corresponding to a person targeted to be recognized.

The present disclosure contains subject matter related to that disclosed in Japanese Priority Patent Application JP 2011-123194 filed in the Japan Patent Office on Jun. 1, 2011, the entire content of which is hereby incorporated by reference.

What is claimed is:

1. An image processing apparatus comprising at least one processor, wherein the image processing apparatus is configured to:
   display a human-figure virtual object image in a calibration pose over an image including a user using the at least one processor, to give visual guidance to the user for adjusting the user's posture in accordance with the calibration pose, wherein the calibration pose is a pose leading the user to take by bending the user's appropriate joints;
   extract joint distance information from an image of the user doing the calibration pose using the at least one processor;
   search for a protruded region where a region of the user's body is protruded from a displayed virtual clothing;
   perform a protruded region adjustment process to the protruded region; and
   display the virtual clothing to have a shape determined based on the protruded region adjustment process,
   wherein the protruded region adjustment process is performed to expand the displayed virtual clothing, or to narrow areas other than the protruded region of the displayed virtual clothing.

2. The image processing apparatus according to claim 1, wherein the image processing apparatus is configured to present information for prompting the user to take a posture conforming to the pose using the at least one processor.

3. The image processing apparatus according to claim 1, wherein the human-figure virtual object image is an image of virtual clothes for try-on purposes.

4. The image processing apparatus of claim 1, wherein the joint distance information is extracted from the image of the user by comparing the image of the user to a plurality of sample images of an image dictionary using the at least one processor.

5. The image processing apparatus of claim 4, wherein each of the plurality of sample images corresponds to different postures of different body types that is compared to the user based on the captured image of the user.

6. The image processing apparatus of claim 5, wherein a selected sample image of the plurality of sample images is used to estimate joint distances of the user, wherein the estimated joint distances of the user are used in generating an augmented reality environment with real-time movement that emulates the movements of the user after the image of the user is captured.

7. The image processing apparatus according to claim 1, wherein the image processing apparatus is further configured to identify an upper-body clothes region.

8. The image processing apparatus according to claim 7, wherein the upper body region is determined by groups of pixels bearing similar color.

9. The image processing apparatus according to claim 7, wherein the image processing apparatus is further configured to identify a special processing region in the upper body region, and wherein the special processing region is replaced with image other than a background image.

10. The image processing apparatus according to claim 9, wherein the special processing region is a collar, bottom edge or sleeve of the virtual clothing determined by a shape of the virtual clothing.

11. The image processing apparatus according to claim 1, wherein the image processing apparatus is further configured to identify a lower-body clothes region.

12. The image processing apparatus according to claim 1, wherein the protruded region is expanded by circumferentially expanding the virtual clothing by an appropriate number of pixels until the virtual clothing covers the upper body region.

13. The image processing apparatus according to claim 1 wherein the protruded region is narrowed by replacing the protruded region with a predetermined image.

14. The image processing apparatus according to claim 13, wherein the predetermined image is a background image.

15. The image processing apparatus according to claim 14, wherein the background image is modified based on a warmth index of the virtual clothing.

16. The image processing apparatus according to claim 1, wherein the displayed virtual clothing is modified based on a texture stiffness of real clothing associated with the virtual clothing.

17. The image processing apparatus according to claim 1, wherein the displayed virtual clothing is modified to show a degree of tightness of the virtual clothing.

18. The image processing apparatus according to claim 17, where an animation is displayed to show the degree of tightness of the virtual clothing.

19. An image processing method implemented by at least one processor, wherein the method comprising:
displaying a human-figure virtual object image over an image including a user using the at least one processor, to give visual guidance to the user for adjusting the user's posture in accordance with the calibration pose, wherein the calibration pose is a pose leading the user to take by bending the user's appropriate joints;
extracting joint distance information from an image of the user doing the calibration pose;
searching for a protruded region where a region of the user's body is protruded from a displayed virtual clothing;
performing protruded region adjustment process to the protruded region; and
display the virtual clothing to have a shape determined based on the protruded region adjustment process,
wherein the protruded region adjustment process is performed to expand the displayed virtual clothing, or to narrow areas other than the protruded region of the displayed virtual clothing.

20. A non-transitory computer-readable medium having embodied thereon a program, which when executed by a processor of a computer causes the processor to perform a method, the method comprising:
displaying a human-figure virtual object image over an image including a user using the at least one processor, to give visual guidance to the user for adjusting the user's posture in accordance with the calibration pose, wherein the calibration pose is a pose leading the user to take by bending the user's appropriate joints;
extracting joint distance information from an image of the user doing the calibration pose;
searching for a protruded region where a region of the user's body is protruded from a displayed virtual clothing,
performing a protruded region adjustment process to the protruded region; and
display the virtual clothing to have a shape determined based on the protruded region adjustment process,
wherein the protruded region adjustment processing is performed to expand the displayed virtual clothing, or to narrow areas other than the protruded region of the displayed virtual clothing.

* * * * *